United States Patent [19]
Walker et al.

[11] Patent Number: 4,617,343
[45] Date of Patent: Oct. 14, 1986

[54] LAMINATING ADHESIVES CONTAINING POLYMERIZED SURFACTANT

[75] Inventors: James L. Walker, Whitehouse Station; Mourad T. Mitry, Flemington, both of N.J.

[73] Assignee: National Starch and Chemical Corporation, Bridgewater, N.J.

[21] Appl. No.: 602,789

[22] Filed: Apr. 23, 1984

[51] Int. Cl.$^4$ .................. C08F 28/02; C08K 3/18; C08K 5/05

[52] U.S. Cl. .................. 524/817; 524/814; 524/807; 524/459; 524/389; 524/547

[58] Field of Search .............. 524/817, 833, 459, 807, 524/814; 526/238.21

[56] References Cited

U.S. PATENT DOCUMENTS

| | | | |
|---|---|---|---|
| 3,673,142 | 6/1972 | Saunders | 260/29.6 |
| 3,925,442 | 12/1975 | Samour | 526/304 |
| 3,980,622 | 9/1976 | Kozuka | 260/79.3 |
| 4,075,411 | 2/1978 | Dickstein | 560/224 |
| 4,200,563 | 4/1980 | Komiya | 524/817 |
| 4,224,455 | 9/1980 | Deutsch | 560/193 |
| 4,246,387 | 1/1981 | Deutsch | 526/209 |
| 4,316,830 | 2/1982 | Mallon | 260/29.6 |
| 4,442,258 | 4/1984 | Sunakawa | 524/833 |

FOREIGN PATENT DOCUMENTS

| | | | |
|---|---|---|---|
| 0031972 | 2/1982 | Japan | 524/833 |
| 2111484 | 7/1983 | United Kingdom | 524/833 |

*Primary Examiner*—C. Warren Ivy
*Attorney, Agent, or Firm*—Ellen T. Dec; Edwin M. Szala

[57] ABSTRACT

Laminating adhesives are prepared from alcohol and an emulsion polymer, the polymer having been prepared in the presence of a polymerizable surfactant.

11 Claims, No Drawings

LAMINATING ADHESIVES CONTAINING POLYMERIZED SURFACTANT

The present invention is directed to pressure sensitive adhesive compositions suitable for use in laminating applications, particularly those overlaminating applications wherein at least one of the surfaces to be laminated is a printed surface. The adhesives of the invention are prepared by conventional emulsion polymerization techniques using polymerizable surfactants; consequently, the resultant adhesives contain little or no free surfactant which may, after laminating, cause blurring or discoloration of the ink on the printed surfaces. The adhesives are further characterized by superior alcohol tolerance thereby permitting dilution with sufficient alcohol to provide wetting of the surface to be coated while requiring no further addition of external surfactant.

BACKGROUND OF THE INVENTION

In recent years, more emphasis has been placed on laminating adhesives prepared from water-borne systems. These systems are generally based on acrylic-vinyl ester emulsions (latexes) which are prepared in emulsion form using conventional emulsion polymerization techniques. There are, however, problems incident to these adhesives, some of which result from the presence of residual surfactant in the compositions. In formulating conventional adhesive compositions suitable for laminating flexible films it is generally necessary to employ surfactants in at least two stages of the preparation. First, surfactants are conventionally used in the emulsion polymerization as protective stabilizers for the polymerized emulsion particles. Secondly, since many of the films which are commonly coated with these laminating adhesives, e.g. polyethylene, polypropylene and silicone coated release liner, are difficult to wet due to their low surface energies, it is generally necessary to post-add additional or other surfactant to the adhesive to facilitate wetting the film or other substrate prior to forming the laminate.

The presence of these conventional surfactants in the cured adhesive films has been found to be detrimental to the laminations for a variety of reasons. In particular, when the adhesive is to be used to form laminates wherein at least one of the surfaces is a printed surface, the presence of the surfactant often leads to discoloration or blurring of the ink. This is recognizably a problem in applications such as overlaminating of books or printed labels where the purpose of the outer surfacing film is to preserve the integrity of the printed surface. It is also known that the presence of surfactant reduces the wet bond strength and water resistance of the laminate.

In order to avoid post-added surfactants, it is desirable to dilute the adhesive compositions with sufficient alcohol to provide adequate wetting. Most laminating adhesive compositions, however, do not have adequate tolerance for addition of the total quantity of alcohol required and therefore post-added surfactant or post-added surfactant plus low levels of alcohol are the most commonly employed methods of lowering their surface tension.

It is an object of the present invention to provide an emulsion adhesive wherein substantially no free surfactant is present in the final adhesive composition.

It is a further object of the invention to provide an emulsion adhesive composition characterized by superior alcohol tolerance so as to avoid the necessity for post-adding surfactant to improve wetting properties.

These and other objects will be obtained from the adhesives of the present invention.

SUMMARY OF THE INVENTION

The present invention is directed to pressure-sensitive laminating adhesive compositions comprising an emulsion polymer prepared by the polymerization of a monomer mixture capable of producing a polymer having a glass transition temperature ($T_g$) of from $-60°$ to $-20°$ C., the emulsion polymerization being carried out in the presence of a polymerizable surfactant and the emulsion polymer capable of being diluted with a compatible water-miscible alcohol. The resulting adhesive compositions have excellent alcohol tolerance and are used to produce laminates characterized by good adhesive properties and resistance to blurring or discoloration of printed surfaces.

The monomers useful for formulating the adhesives of the present invention are carefully selected to ensure the production of a polymer having a Tg of $-60°$ to $-20°$ C., preferably $-50°$ to $-35°$ C. Additionally, the polymer is tailored to contain a specific combination of monomers within predetermined monomeric ranges, the polymer consisting essentially of:

(a) at least 40%, preferably at least 70%, by weight of an acrylic or methacrylic acid ester monomer containing 4 to 12 carbon atoms or mixture of such esters;

(b) from 12 to 40%, preferably 15 to 20%, of a water miscible vinyl ester of an aliphatic acid containing 1 to 13 carbon atoms;

(c) from 1 to 10%, preferably 2 to 5%, of a monoethylenically unsaturated mono- or dicarboxylic acid containing 2 to 5 carbon atoms or the hydroxyalkyl ($C_2$-$C_4$) esters thereof;

(d) from 0.75 to 10%, preferably 1 to 3%, of a polymerizable surfactant;

(e) from 0 to 19%, preferably 0 to 5%, of a half ester or salt of an ethylenically unsaturated acid containing 2 to 8 carbon atoms in the ester portion thereof, wherein the total of components (c) and (e) are less than 20% by weight of the total polymer; and (f) from 0 to 20%, preferably 0 to 5%, of other copolymerizable monomers; wherein the adhesive polymer emulsion is characterized by its ability to be diluted with at least 15 parts alcohol per 100 parts wet emulsion.

DETAILED DESCRIPTION OF THE PREFERRED EMBODIMENTS

Illustrative of acrylic and methacrylic acid esters suitable herein are n-butyl acrylate, 2-ethylhexyl acrylate, isobutyl acrylate, ethyl acrylate, methyl methacrylate, n-propyl acrylate, isopropyl acrylate, pentyl acrylate and the like.

Illustrative of suitable vinyl esters are vinyl acetate, vinyl propionate, vinyl butyrate, vinyl versatate, and the like. The amount of the vinyl ester employed has been found to be critical in obtaining the required degree of alcohol tolerance with adhesive compositions containing less than about 12% by weight of the vinyl ester not tolerating the minimum amount of alcohol required to achieve wetting of the substrate surfaces.

As was found with respect to the vinyl ester component, certain minimum levels of monoethylenically unsaturated mono- or dicarboxylic acids or hydroxyalkyl esters thereof, generally in the order of at least about 1%, preferably at least about 2%, must be present in the composition in order to achieve the required alcohol tolerance levels. The specific amount of the acidic component required is generally inversely related to the amount of polymerizable surfactant used in the emulsion polymer. The preferred acids are acrylic acid and methacrylic acid, but other copolymerizable acids such as crotonic acid, itaconic acid, maleic acid, and fumaric acid can also be employed. The preferred hydroxyalkyl esters are hydroxyalkyl esters of acrylic acid, methacrylic acid, and other alpha-beta ethylenically unsaturated carboxylic acids. Examples include 3-hydroxyethyl acrylate, 2-hydroxypropyl acrylate, 3-hydroxypropyl acrylate, 3-hydroxyethyl methacrylate, 2-hydroxypropyl methacrylate, 3-hydroxypropyl methacrylate, 4-hydroxybutyl methacrylate, and corresponding esters of other unsaturated acids. There may also be employed mono- or di-esters of unsaturated dicarboxylic acids such as maleic acid, fumaric acid, and itaconic acid in which at least one of the esterifying groups contains a hydroxyl group. Examples of such esters include: mono(2-hydroxyethyl)maleate; mono-(2-hydroxyethyl) fumarate; bis(2-hydroxyethyl)maleate; mono-(2-hydroxypropyl) maleate; bis(2-hydroxyethyl)itaconate; mono-(2-hydroxyethyl)itaconate, bis(2-hydroxyethyl)itaconate; and 2-hydroxyethylbutyl maleate.

The half esters of the dicarboxylic acids optionally used herein include mono(2-ethylhexyl)maleate, monoethyl maleate, monobutyl maleate, methyl hydrogen fumarate, butyl hydrogen fumarate, ethyl hydroxy maleate, butyl hydrogen maleate, etc. Other representative optional unsaturated acids include vinyl sulfonic acid, acrylamidomethylpropane sulfonic acid, etc. and the salts thereof such as sodium vinyl sulfonate.

The adhesives may also contain other copolymerizable monomers including, for example, acrylamide and acrylonitrile as well as the ehtylene or diene monomers such as ethylene, propylene, butadiene, isoprene, chloroprene, styrene, α-methylstyrene, dimethylstyrene, vinyl ether, vinyl chloride and vinylidene chloride. Also included among these optional copolymerizable monomers are known crosslinking comonomers such as methylolacrylamide, methacrylamide, allyl acrylate, vinyl acrylate, N-isobutoxymethylacrylamide, allyl carbamate, alkylolated allyl carbamate, etc. These optional comonomers are generally present at levels less than about 20% by weight depending on the specific monomer chosen. In the case of the crosslinking comonomers, levels less than about 4% are generally used since higher levels will result in polymers outside the defined Tg range.

It will be recognized by one skilled in the art that not all of the above illustrative monomers will be mutually compatible, nor will all proportions produce copolymers within the required Tg range. The practitioner will therefore be left to choose the particular monomer components as well as their relative proportions in order to achieve a satisfactory copolymer for use herein.

The polymerizable surfactant utilized in the preparation of the adhesive compositions of the invention may be any of the available polymerizable surfactants, i.e. those surfactants containing moieties capable of entering into the polymerization reaction. Exemplary of the polymerizable surfactants used herein are the vinyl-reactive surfactants comprising the esters of acrylic, methacrylic and crotonic acids and the mono- and di-esters of maleic, fumaric, itaconic and aconitic acids with (a) $C_8$–$C_{20}$ alkyl phenoxy (ethleneyoxy)$_{10-60}$ ethyl alcohols, (b) (ethyleneoxy)$_{15-25}$ sorbitan esters of $C_{12}$–$C_{20}$ fatty acids and (c) methyl cellulose, hydroxyethyl cellulose, and hydroxymethylcellulose and polyvinyl alcohol as are taught in U.S. Pat. No. 4,075,411.

Representative surfactants include the ring sulfonated maleate half esters of alkoxylated alkyl arylols disclosed in U.S. Pat. No. 4,246,387 and having the formula:

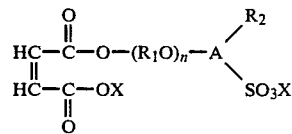

where $R_1$ is selected from the group consisting of ethylene, propylene, and mixtures thereof, $R_2$ is selected from the group consisting of hydrogen and alkyl groups each of which contains from 5 through 18 carbon atoms each, A is selected from the group consisting of phenyl nuclei or substituted phenyl nuclei and naphthyl nuclei or substituted naphthyl nuclei, X is selected from the group consisting of hydrogen, alkali metals, ammonium, lower monoalkyl amines lower dialkyl amines, lower trialkyl amines, lower monoalkanol amines, lower dialkanol amines, lower trialkanol amines, heterocyclic amines, phosphates, and mixtures thereof, and n is a number of from about 2 through 50 inclusive, provided that, when $R_2$ is hydrogen $(R_{10})_n$ has at least one of the following structures.

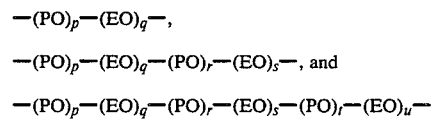

wherein p, r, and t, when present, are each an independently selected number of from about 3 through 9, inclusive;

q, s, and n, when present, are each an independently selected number of from about 1 through 4 inclusive, and when the associated (EO) entity is a terminated block, q, s, and n can each be an independently selected positive number of from 1 to 20, P is propylene, and E is ethylene.

A particularly preferred subclass of the latter surfactants is characterized by the formula:

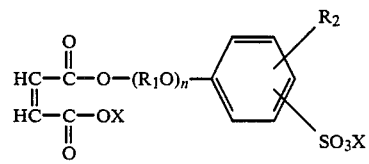

wherein $R_1$ is selected from the group consisting of ethylene, propylene, and mixtures thereof, $R_2$ is an alkyl group consisting from about 8 to 18 carbon atoms, X is selected from the group consisting of hydrogen, alkali metals and ammonium, n is a number ranging from about 2 to 50.

Another class of polymerizable surfactants useful herein are those compounds taught in U.S. Pat. No. 3,980,622 and having the formula:

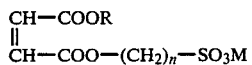

wherein R is alkyl of 6 to 22 carbon atoms, M is H, Li, Na, K or NH$_4$ and n is an integer of 2 to 4.

Also useful are the polymerizable (allyl) sulfosuccinates available from Diamond Shamrock under the tradename TREM-LF.

While the use of some of these polymerizable surfactants in the formation of emulsions suitable for adhesives has been generally taught, no one heretofore has suggested the use of these surfactants in the particular class of pressure sensitive laminating emulsion adhesives wherein resistance to bleed-out and high alcohol tolerance are required.

The polymerization reaction is carried out using any of the known emulsion polymerization techniques as those reported in F. A. Bovey et al. "Emulsion Polymerization", Wiley (Interscience) New York, 1955, or summarized in the chapters by J. W. Vanderhoff, W. F. Fowler, Jr. and Harry K. Stryker et al. in G. E. Ham's "Vinyl Polymerization Part II", Marcel Dekker, New York, 1969.

The many parameters of emulsion polymerization technique can be adjusted by those skilled in the art to obtain particular desired results. The comonomers can be added to the aqueous phase gradually or in one charge. Initiator can also be added according to a variety of possible schedules. Thus one or more of the comonomers can be emulsified first in the stirred aqueous phase before initiation is begun, or a saturated solution of a gaseous monomer can be maintained in the presence of surfactant comonomers and of initiator before comonomers are added gradually with or without additional surfactive monomers. Monomers can be added continuously or in staggered increments. Additionally, a polymerization can be started in the presence of a previously prepared seed. Similarly, depending upon the reactivity of the other monomers involved, the polymerizable surfactant may be introduced into the polymerization emulsion at once at the time of polymerization, periodically introducing a part of the polymerizable materials throughout polymerization or continuously introducing a part of the polymerizable materials during the course of the polymerization.

The free radical donors used to initiate the copolymerization can be selected from any of the initiators for aqueous emulsion copolymerization known in the art including those which undergo scission under the influence of heat and those which are caused to form free radicals by reaction with reducing agents. Water-soluble initiators are usually to be preferred including potassium persulfate, ammonium peroxydiphosphate, hydrogen peroxide and others which will be known to those skilled in the art. When reducing agents are used, it is preferred to use water soluble materials such as sodium formaldehyde sulfoxylate, sodium metabisulfite and ascorbic acid. The amounts to be used depend upon the desired rate of polymerization and upon other factors well known in the art. Preferably the aqueous emulsion composition contains between about 0.1 and 10 percent, especially from about 0.2 to 2 percent by weight of initiator. If a reducing agent is used, it also is used in amount totaling between about 0.1 and 5 percent, especially from 0.2 to 2 percent by weight of the finished emulsion. Those skilled in the art will recognize that the amount of initiator used may vary depending upon the particular initiator employed as well as the molecular weight of the polymer desired. Generally the use of higher initiator levels results in polymers of lower molecular weight, and vice-versa.

While reaction temperature of emulsion polymerization can be varied over a wide range, exemplarily using water or oil circulating through jackets or coils for heating and cooling, it is convenient in the case of monomers like vinyl acetate to use reflux condensation as a means of controlling temperature. As to pressure, atmospheric pressure is convenient for many types of copolymerization, but it is suitable to have superatmospheric pressures to confine gaseous monomers like ethylene or butadiene or easily volatile monomers such as vinyl chloride. Pressure is also useful in certain instances to attain desired levels of solubility of monomers in the polymerizing system. Typical elevated pressures vary from about 50 to 150 psi to 10 atmospheres or more. The usual adjustments to control pH, viscosity and other properties can also be used.

The polymerizable surfactant is generally present in the polymer in amounts of about 0.75 to 10% thereof. While other non-polymerizable anionic, cationic or nonionic dispersing agents or surfactants could be used in the polymerization, they should be used only in such small concentrations (i.e. less than about 0.3 to 0.5) that their presence will not have a discernible effect on end use performance. The use of larger amounts which would detract from the properties desired in the final adhesive composition is therefore not contemplated herein.

The emulsion is generally prepared at a solids content of about 40 to 65% by weight and, prior to use, is diluted with alcohol or alcohol and water to a final solids content of about 15-45%. In so doing it is preferred to add 15 to 20 parts alcohol per 100 parts (wet) interpolymer emulsion, so as to provide for adequate wetting of the substrate to be coated without the necessity for the use of any externally added surfactant. Any water-miscible, sufficiently volatile primary or secondary alcohol compatible with the adhesive including ethyl, n-propyl, isopropyl, isobutyl or n-butyl alcohol may be used.

In addition to the components described above, additives which are conventionally used in laminating adhesives may also be included. Such additives include for example, defoamers (preferably non-silicone types), pH controlling agents, salts, organic solvents, humectants, etc. These additives, if used, are present in conventional concentrations well known to those skilled in the art.

Also contemplated herein are acrylic emulsion adhesive systems which are subsequently cured or otherwise improved as by the addition of externally added curing agents or by use of polyvalent metals, especially metal alkoxides or chelated metal alkoxides, such as are disclosed in U.S. Pat. No. 3,740,366 and 3,769,254. These metal compounds when reacted with the carboxyl or hydroxyl functionality of the adhesive interpolymer produce adhesives which are substantially improved with respect to their cohesive strengths. Additionally, in the embodiments wherein carboxyl or, preferably, hydroxyl containing monomers are present in the polymer, methylol releasing agents such as urea or melamine formaldehyde type resins may be used to provide post crosslinking of the adhesive.

The laminates of the present invention may contain laminae of a wide variety of flexible materials. Thus suitable laminae include films of polyethylene and polypropylene generally treated for adhesion promotion; also polyester such as polyethylene terephthalate, cellophane and polyamide which may or may not be coated with PVDC for improved barrier properties. Preferably, dissimilar laminae are used where films, for example, of corona treated polypropylene or polyethylene are bonded to polyester, polyamide or PVDC coated cellophane or PVDC coated polyester, or paper. Also contemplated within the present invention are laminates prepared with woven and non-woven fabrics where the fibers are of cotton, polyester, polyolefin, polyamide, polyimide and the like; metallic foils such as aluminum foil; metallized films; paper and paperboard; and cellular flexible sheet material such as polyethylene foam, polyurethane foam and sponge and foam rubber.

In the preferred embodiment wherein one of the laminae is a printed surface, any of the conventionally used solvent-borne or aqueous inks may be employed in the printing process.

In forming the laminates of the present invention, conventional techniques known per se are employed to apply the adhesive emulsion to the film substrate. Thus, these adhesives may be applied by use of any mechanical coating process such as air knife, trailing blade, knife coater, reverse roll or gravure coating technique. Most commonly, the adhesive is coated on a release liner, allowed to dry at room temperature and then oven dried at about 250° F. for 10 minutes. The adhesive on the release liner is then laminated to the desired substrate, for example, a corona treated polyethylene or polypropylene film or other lamina.

The resultant laminate is characterized by the immediate formation of a strong bond and resistance to bleed-out or blurring of any ink printed surfaces.

There are set forth below several examples which serve to illustrate the invention. All parts and percentages are by weight unless otherwise indicated.

TESTING PROCEDURES

In the examples which follow, the adhesive compositions were evaluated using the procedures as indicated:

Adhesive Performance: The adhesive was coated onto release liner of low surface energy and allowed to dry for 5 minutes at 275° F. The adhesive was then transferred to 1 mil Mylar ® film and bonded to a stainless steel surface. The adhesive was tested and considered to have "passed" if it met the following criteria:
(a)

| 180° Peel (PSTC-1 test) | Criteria: 38 oz/inch |

(b) Shear Adhesion (PSTC-7 test modified for 15 minutes wet out before applying load)

| 2 psi | Criteria: 20 hours |
| 4 psi | Criteria: 3 hours |

Alcohol Tolerance: Isopropanol was added with mild agitation in an amount of 15 to 20% by weight of the wet emulsion. If the emulsion did not coagulate or thicken excessively within one week when held at room temperature, the adhesive was considered to be alcohol tolerant.

Ink Bleeding: The adhesive coated Mylar prepared above was laminated to various printed surfaces and labels. The assemblies were than aged both at room temperature and at 160° F. for 24 hour and 1 week periods. The labels and printed surfaces were visually inspected for ink discoloration or blurring over these periods and observations recorded.

EXAMPLE I

The following example illustrates the preparation of an emulsion adhesive typical of those of the present invention as well as the detrimental effects on ink bleeding properties of increasing levels of conventional surfactants.

| A. | Initial Charge | |
|---|---|---|
| | 400 gms | distilled water |
| | 3 gms | Polystep RA35S (35%) (a Trademark for polymerizable surfactant comprising a solution of an ester of an alkoxylated alkyl phenol sodium sulfonate available from Stephen Chemical Co.) |
| | 1.5 gms | Ethoxylated Lauryl Alcohol Sulfate, Sodium salt (30%) |
| | 1.0 gms | Sodium persulfate |
| B. | 20 gms | Butyl Acrylate |
| | 30 gms | Vinyl Acetate |
| C. | 120 gms | distilled water |
| | 20 gms | Polystep RA35S (35%) |
| | 5 gms | Ethoxylated Lauryl Alcohol Sulfate, Sodium salt (30%) |
| | 1.0 gms | Sodium persulfate |
| D. | 180 gms | Butyl Acrylate |
| | 200 gms | 2-Ethylhexyl Acrylate |
| | 70 gms | Vinyl Acetate |
| | 10 gms | Acrylic Acid |

Initial charge "A" was added to a 2-liter four neck flask equipped with a stirrer, condenser, thermometer, $N_2$ purge and addition funnels and then purged with nitrogen for 15 minutes. The initial monomer charge "B" was then added and the reaction mixture heated to 70°-75° C. After polymerization initiated, the aqueous slow-addition "C" and the monomer slow addition "D" were added uniformly over four hours with the temperature maintained at 70°-75° C. After the additions were complete, the batch was held for one hour at 75° C., cooled and discharged. This latex was designated Sample 1.

The polymerization procedure described above was repeated, however, the level of ethoxylated lauryl alcohol sulfate (sodium salt) in addition "C" was increased to 25 grams. The resultant latex was designated Sample 2.

A third latex (Sample 3) was prepared using only conventional surfactant (no polymerizable surfactant) as follows:

| A. | Initial Charge | |
|---|---|---|
| | 420 gms | distilled water |
| | 3 gms | Ethoxylated Lauryl Alcohol Sulfate, Sodium salt |
| | 1 gms | Ammonium persulfate |
| B. | 20 gms | Butyl acrylate |
| | 30 gms | Vinyl acetate |
| C. | 120 gms | distilled water |
| | 30 gms | Ethoxylated Lauryl Alcohol Sulfate, Sodium salt |
| | 1 gms | Ammonium persulfate |
| D. | 180 gms | Butyl acrylate |
| | 200 gms | 2-Ethyl hexyl Acrylate |

-continued

| | |
|---|---|
| 70 gms | Vinyl Acetate |
| 10 gms | Acrylic Acid |

The properties of the three emulsions were analyzed as follows:

| | 1 | 2 | 3 |
|---|---|---|---|
| % Solids | 47.5 | 48.0 | 47.5 |
| % Conversion | 97.5 | 98 | 98 |
| pH | 4.0 | 3.5 | 4.0 |
| Particle Size (μ) | 0.19 | 0.19 | 0.20 |
| % Coagulum (200 mesh) | 0.010 | 0.020 | 0.050 |
| Viscosity (cps) | 60 | 175 | 200 |

The adhesive latexes were then tested using the procedures described previously. The results are shown below:

| Sample | Adhesive Properties | Ink Bleeding | Alcohol Tolerance |
|---|---|---|---|
| 1 | Good | None | Passed |
| 2 | Good | Bleeding within 1 week | Passed |
| 3 | Good | Bleeding within 24 hours | Passed |

The results show that as the level of conventional surfactant is increased, blurring and/or discoloration of the laminate occurs.

EXAMPLE II

The polymer preparation of Example I (Sample 1) was repeated using an allyl sulfosuccinate polymerizable surfactant. Thus, the Polystep RA35S used in Example I was replaced on an equal weight basis with TREM-LF (40%) a polymerizable (allyl) sulfosuccinate available from Diamond Shamrock. The analytical data showed the following:

| | |
|---|---|
| % Solids | 47.5 |
| % Conversion | 97 |
| pH | 3.3 |
| Particle Size (μ) | 0.17 |
| % Coagulum | 0.050 |
| Viscosity (cps) | 175 |

The emulsion polymer possessed good adhesive properties and alcohol tolerance and laminates formed therewith exhibited no ink blurring or discoloration.

EXAMPLE III

The polymer preparation of Example I (Sample 1) was repeated with the monomer compositions varied by changing the monomer addition in "D" as indicated below:

| Sample | Butyl Acrylate | Vinyl Acetate | Acrylic Acid | 2-Ethylhexyl Acrylate |
|---|---|---|---|---|
| 4 | 380 | 70 | 20 | — |
| 5 | 105 | 20 | 10 | 325 |

The resulting emulsions had the following analytical properties:

| | 4 | 5 |
|---|---|---|
| % Solids | 47.5 | 47.0 |
| % Conversion | 98 | 97 |
| pH | 4.4 | 4.2 |
| Particle Size (μ) | 0.13 | 0.12 |
| % Coagulum | 0.025 | 0.010 |
| Viscosity (cps) | 150 | 100 |

Both samples showed good alcohol tolerance and adhesion properties. No label discoloration or blurring was observed.

EXAMPLE IV

A polymer is prepared as in Example I using butyl acrylate, vinyl acetate and acrylic acid in a ratio of 80/20/2. In the preparation of this polymer no conventional surfactant was employed and 3.3 parts (dry weight) Polystep RA35S were used. The adhesive emulsion possessed good adhesive properties and alcohol tolerance and laminates formed therewith exhibited no discoloration or blurring.

EXAMPLE V (Comparative)

The monomer composition in Example I (Sample 1) was changed to butyl acrylate/2 ethyl hexyl acrylate/acrylic acid in a 80/20/2 ratio and a polymer prepared using the same polymerization procedure. The analytical properties were as follows:

| | |
|---|---|
| % Solids | 47.0 |
| pH | 4.2 |
| Particle Size (μ) | 0.18 |
| % Coagulum | 0.010 |
| Viscosity (cps) | 120 |

While the evaluation of the adhesive and ink bleeding properties showed good results evaluation of the alcohol tolerance of this non-vinyl acetate containing system was poor.

An additional sample was prepared using a monomer charge of 50 parts butyl acrylate, 40 parts 2-ethylhexyl acrylate, 10 parts vinyl acetate and 2 parts acrylic acid. When evaluated, the resultant emulsion adhesive did not possess adequate alcohol tolerance.

EXAMPLE VI

The monomer composition of Example I (Sample 1) was modified to include 3 parts per hundred of total monomer of monooctylmaleate. The analytical data were as follows:

| | |
|---|---|
| % Solids | 47.2 |
| % Conversion | 96 |
| pH | 4.4 |
| Particle Size (μ) | 0.17 |
| % Coagulum | 0.001 |
| Viscosity (cps) | 86 |

The adhesives had good alcohol tolerance and adhesion properties and laminates formed therewith exhibited no ink bleeding.

Further, in order to improve the cohesive properties 0.15 parts aluminum acetate was added. This addition increased the Williams plasticity monomer (measured according to ASTM Method D-926) from 1.9 to 2.2.

EXAMPLE VII

Using the procedure described in Example I, other representative emulsion adhesive polymers were prepared using, the following monomer charges (parts are by weight).

| Butyl Acrylate | 2-Ethylhexyl Acrylate | Vinyl Acetate | Other Monomer | Parts |
|---|---|---|---|---|
| 80 | — | 20 | acrylic acid | 2 |
| — | 75 | 25 | methacrylic acid | 2 |
| 40 | 40 | 20 | acrylic acid | 2 |
| 5 | 75 | 20 | acrylic acid | 2 |
| 40 | 40 | 20 | hydroxyethyl acrylate | 4 |
| 40 | 40 | 20 | acrylic acid acrylamide | 2 1.6 |

All samples possessed good adhesive properties and alcohol tolerance and exhibited no ink bleeding.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A pressure sensitive laminating adhesive polymer emulsion having a glass transition temperature of from −60° to −20° C., the emulsion polymer consisting essentially of:
(a) at least 70% by weight of the polymer of an acrylic or methacrylic acid ester containing 4 to 12 carbon atoms or mixture of such esters;
(b) from 15 to 20% of the polymer of a water miscible vinyl ester of an aliphatic carboxylic acid containing 1 to 13 carbon atoms;
(c) from 2 to 10% of the polymer of a monoethylenically unsaturated mono- or di-carboxylic acid containing 2 to 5 carbon atoms or the hydroxyalkyl ($C_2$–$C_4$) esters thereof;
(d) from 0.75 to 10% of the polymer of a polymerizable surfactant selected from the class consisting of:
(i) ring sulfonated maleate half esters of an alkoxylated alkyl arylol having the formula:

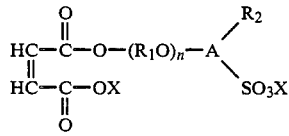

where
$R_1$ is selected from the group consising of ethylene, propylene, and mixtures thereof,
$R_2$ is selected from the group consisting of hydrogen and alkyl groups each of which contains from 5 through 18 carbon atoms each,
A is selected from the group consisting of phenyl nuclei or phenyl nuclei and naphthyl nuclei or naphthyl nuclei,
X is selected from the group consisting of hydrogen, alkali, metals, ammonium, lower monoalkyl amines lower dialkyl amines, lower trialkyl amines, lower monoalkanol amines, lower dialkanol amines, lower trialkanol amines, heterocyclic amines, phosphates, and mixtures thereof, and
n is a number of from about 2 through 50 inclusive, provided that, when $R_2$ is hydrogen $(R_1O)_n$ has at least one of the following structures:

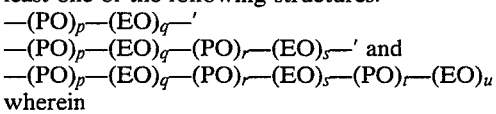

wherein
p, r, and t, when present, are each an independently selected number of from about 3 through 9 inclusive;
q, s, and u, when present, are each an independently selected number of from about 1 through 4 inclusive, and when the associated (EO) entity is a terminated block, q, s, and u can each be an independently selected positive number of from 1 to 20,
P is propylene, and
E is ethylene;
(ii) compounds of the formula:

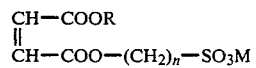

wherein
R is alkyl of 6 to 22 carbon atoms, M is H, Li, Na, K or $NH_4$ and n is an integer 2 to 4; and
(iii) polymerizable (allyl) sulfosuccinates;
(e) from 0 to 19% of the polymer of a half ester or salt of a dicarboxylic acid containing 2 to 8 carbon atoms in the ester portion thereof, wherein the total of components (c) and (e) are less than 20% by weight of the total polymer; and
(f) from 0 to 20% of other copolymerizable monomers. wherein the adhesive polymer emulsion is characterized by its ability to be diluted with at least 15 parts alcohol per 100 parts wet emulsion.

2. The laminating adhesive emulsion polymer of claim 1 wherein the acrylic or methacrylic acid ester is selected from the group consisting of n-butyl acrylate, 2-ethylhexyl acrylate, isobutyl acrylate, ethyl acrylate, methyl methacrylate, n-propyl acrylate, isopropyl acrylate, and pentyl acrylate.

3. The laminating adhesive emulsion polymer of claim 1 wherein the vinyl ester is seleced from the group consisting of vinyl acetate, vinyl propionate, vinyl butylate and vinyl versatate.

4. The laminating adhesive emulsion polymer of claim 3 wherein the vinyl ester is vinyl acetate.

5. The laminating adhesive emulsion polymer of claim 1 wherein component (c) is acrylic or methacrylic acid.

6. The laminating adhesive emulsion polymer of claim 1 wherein component (c) is selected from the group consisting of 3-hydroxyethyl acrylate, 2-hydroxypropyl acrylate, 3-hydroxypropyl acrylate, 3-hydroxyethyl methacrylate, 2-hydroxypropyl methacrylate, 3-hydroxypropyl methacrylate, 4-hydroxybutyl methacrylate, mono(2-hydroxyethyl) maleate, mono(2-hydroxyethyl) fumarate, bis(2-hydroxyethyl) maleate, mono(2-hydroxypropyl) maleate, bis(2-hydroxyethyl)itaconate, mono(2-hydroxyethyl) itaconate, bis(2-hydroxyethyl) itaconate and 2-hydroxyethylbutyl maleate.

7. The laminating adhesive emulsion polymer of claim 1 wherein there is additionally present in the emulsion polymerization less than 0.5% by weight of a non-polymerizable surfactant.

8. The laminating adhesive emulsion polymer of claim 1 wherein the polymerizable surfactant is a ring sulfonated maleate half ester of an alkoxylated alkyl arylol having the formula:

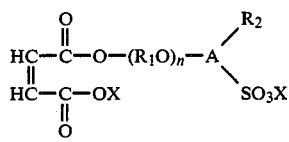

where $R_1$ is selected from the group consisting of ethylene, propylene, and mixtures thereof, $R_2$ is selected from the group consisting of hydrogen and alkyl groups each of which contains from 5 through 18 carbon atoms each, A is selected from the group consisting of phenyl nuclei or phenyl nuclei and naphthyl nuclei or naphthyl nuclei, X is selected from the group consisting of hydrogen, alkali metals, ammonium, lower monoalkyl amines lower dialkyl amines, lower trialkyl amines, lower monoalkanol amines, lower dialkanol amines, lower trialkanol amines, heterocylic amines, phosphates, and mixtures thereof, and n is a number of from about 2 through 50 inclusive, provided that, when $R_2$ is hydrogen $(R_1O)_n$ has at least one of the following structures —$(PO)_p$—$(EO)_q$—
—$(PO)_p$—$(EO)_q$—$(PO)_r$—$(EO)_s$—, and
—$(PO)_p$—$(EO)_q$—$(PO)_r$—$(EO)_s$—$(PO)_t$—$(EO)_u$— wherein p, r, and t, when present, are each an independently selected number of from about 3 through 9, inclusive;

q, s and u, when present, are each an independently selected number of from about 1 through 4 inclusive, and when the associated (EO) entity is a terminated block, q, s, and u can each be an independently selected positive number of from 1 to 20, P is propylene, and E is ethylene.

9. The laminating adhesive emulsion polymer of claim 1 wherein the polymerizable surfactant has the formula:

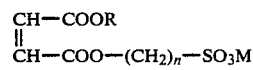

wherein R is alkyl of 6 to 22 carbon atoms, M is H, Li, Na, K or $NH_4$ and n is an integer of 2 to 4.

10. The laminating adhesive emulsion polymer of claim 1 wherein the polymerizable surfactant is a polymerizable allyl sulfosuccinate.

11. The laminating adhesive emulsion polymer of claim 1 additionally containing a polyvalent metal alkoxide or chelated polyvalent metal alkoxide.

* * * * *